Patented Sept. 25, 1951

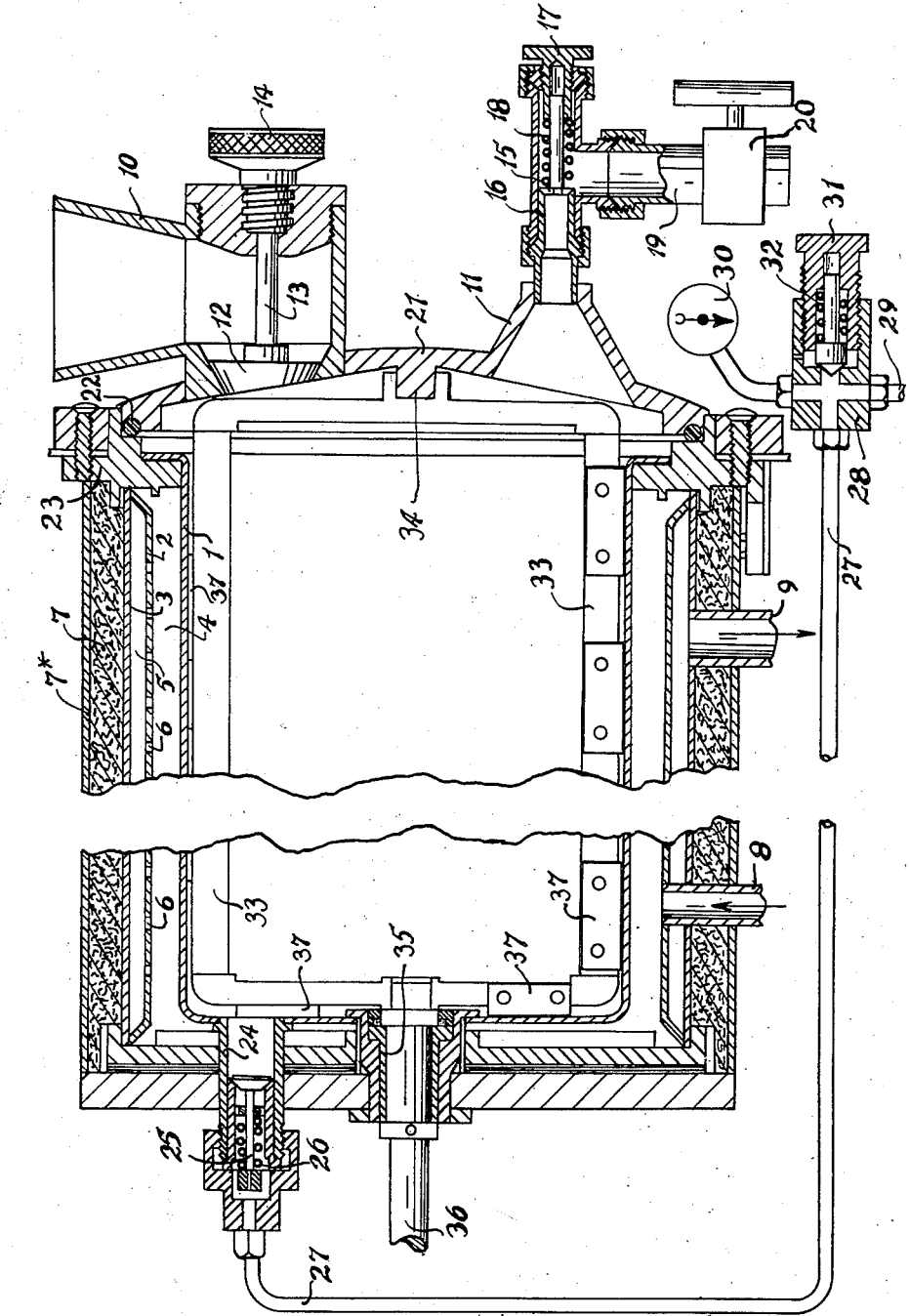

2,569,235

UNITED STATES PATENT OFFICE 2,569,235

REGULATING AIR-CHARGING MEANS FOR ICE-CREAM FREEZERS

Tito Giusti and Raolo Benvenuto Giusti, London, England

Application December 16, 1949, Serial No. 133,232
In Great Britain December 29, 1948

3 Claims. (Cl. 259—9)

1

This invention relates to ice-cream freezers, its object being to provide an improved construction of combined freezing and whipping chamber for mixing air into ice-cream whilst being frozen in batches wherein air at controlled pressure can be introduced into the pre-charged and sealed mixer chamber to give a required amount of over-run, that is to say, of air beaten into the ice-cream mix.

According to the present invention, apparatus for freezing, aerating and beating a charge of ice-cream mix comprises a refrigerated mixing chamber having beaters and scrapers and which is adapted to receive the whole of the quantity of ice-cream mix to be treated, means for supplying air at constant pressure to the chamber, and means for sealing the chamber after the introduction of the charge and the required amount of air thereinto, the chamber remaining sealed during the whole period of refrigeration and beating of the air into the mix.

The discharge of the treated mix from the chamber at a predetermined rate of flow may be effected by the air under pressure fed to or contained in the chamber.

The untreated ice-cream mix may be introduced into the chamber when the latter contains air at higher than atmospheric pressure, by pumping or other known means, or the air in the chamber may be reduced to atmospheric pressure and the ice-cream mix introduced in the normal manner.

The compressed air may be supplied by any known means, and preferably by means of a separate air pump the output pressure of which is controlled by a blow-off valve set to operate at a predetermined pressure according to the amount of air which it is desired to introduce.

The chamber has an inlet aperture and an outlet aperture suitably positioned and both of which can preferably be sealed by air-tight closure members.

In order that the invention may be more fully understood, a construction thereof is shown by way of example in the accompanying drawing, wherein the figure shows a central vertical section of the apparatus looking from one side.

In this drawing a cylindrical chamber 1 is arranged within two concentric refrigerating cylinders 2 and 3 forming annular passages 4 and 5 through which the refrigerant flows. Holes 6 are provided between the passages 4 and 5. Outside the cylinder 3 is arranged lagging 7 and an outer casing 7*. Inlet means 8 and outlet means 9 for the refrigerant gas are provided on the

2 cylinders 2 and 3 respectively, whereby the gas can be pumped in at the inlet means 8, pass upwardly about the cylinder 2, flow through the holes 6 and then pass downwardly within the cylinder 2 to eventually be discharged at the outlet means 9. The chamber 1 is provided at the right-hand end in this figure with a filling opening 10 and a delivery opening 11, respectively at the upper and lower parts of the chamber. Opening 10 has a releasable valve 12 controlled by a rod 13 coupled to a quick-thread knurled knob 14, whereby the valve can be firstly opened a small amount by rotation of the knob 14, and then pulled clear of the corresponding valve aperture so as to leave a substantially unrestricted passage. Delivery opening 11 leads to a spring-loaded delivery valve 15 coacting with a valve seating 16, the spring pressure on the valve tending to close it being adjustable by means of a screw-threaded seating 17 receiving one end of a spring 18, the other end of which bears on the delivery valve 15. From the delivery valve 15 a conduit 19 leads to a control cock 20 of known kind. Both the openings 10 and 11 are arranged on a removable end 21 for the apparatus, said end being adapted to be clamped in position by a plurality of suitable tightening bolts, handles or the like (not shown). A compressible seal 22, such as a rubber ring, is arranged between the end 21 and a flange 23 of the apparatus to ensure airtightness. At the other end, the chamber 1 has a compressed air inlet 24 provided with a non-return valve 25 suitably loaded by a spring 26. 27 is a conduit conveying compressed air from a blow-off pressure limiting valve 28. 29 is a conduit from a compressor (not shown) leading air into valve 28, the pressure present therein being indicated by a pressure gauge of known kind 30. Valve 28 has a spring-loaded plunger which allows any excess pressure to blow off into the atmosphere, whereby the pressure supplied to the conduit 27, and hence to the chamber 1, remains substantially constant. The blow-off pressure of valve 28 is adjustable by means of a screw-threaded seating 31 receiving the spring 32 of the valve. The compressor would normally run continuously during operation of the apparatus. Within the chamber 1 are arranged beater arms 33 carried at one end on a bearing block 34 arranged centrally on end 21 and at the other end in a bearing 35, a driving shaft 36 extending from the apparatus being coupled to the beater arms. Each beater arm 33 carries a number of scrapers 37 which are set close to or in scraping contact with the walls of the chamber 1 and serve to remove particles of the mix which would otherwise stick thereto.

With such a construction, the operation is as follows:

The chamber vessel is firstly charged with the whole of the quantity of ice-cream mix to be treated in the batch. The mix is introduced through filling opening 10 and for this purpose, the valve 12 is firstly released a small amount to allow the pressure built up in the chamber by the compressor to escape. When the pressure is lowered substantially to atmospheric, the mix can then be pumped or poured in as required. The chamber is then sealed up and air under pressure is allowed in through the non-return valve 25. The pressure of the air which enters is controlled in the manner described precedingly and is set at a suitable value by previous adjustments of the seating 31 of the blow-off valve. When the contents of the chamber are at the required pressure no more air enters. The mix under pressure is mixed by the beater arms and cooled or frozen by the refrigerating means described, the air in the chamber being beaten into the mix. As the air pressure and the volume of the chamber can be readily determined, the amount of air introduced into a known quantity of mix can be ascertained and the consistency varied accordingly. After the treatment has been performed, the chamber is unsealed and the mix can be removed by the action of the air in the chamber expanding and pushing it out. In order that the flow of the mix from the apparatus may be controlled at a reasonable rate, the delivery valve 15 is adjusted so as to provide the required flow when the control cock 20 is opened. The end 21 of the apparatus can be released and removed at intervals for cleaning or the like when required.

With this apparatus, the quantity of air introduced into the chamber remains constant during the whole time of treatment of the mix and consequently the amount incorporated in the mix can be very precisely determined. By variation of the pressure of the air applied to the chamber, the over-run, that is to say the degree of aeration of the mix, can be readily controlled, and the mix can be subjected to the air pressure whilst the freezing and beating operations is carried out for as long as desired under a constant pressure.

A particular advantage of this "batch" method and apparatus is the possibility of introducing additional relatively lumpy non-liquid ingredients such as for instance fruit, nuts, pistachio, cherries and the like into the mix at or before the time of charging the chamber. Such other ingredients are commonly required and cannot normally be introduced into so-called "continuous" freezers without a great deal of added complication because of the obvious difficulty of introduction and discharge from the mixing chamber.

We claim:

1. Apparatus for freezing, aerating and beating, a charge of ice-cream mix, of the kind comprising a refrigerated mixing chamber, to receive the whole of the charge, beating and scraping means revolvably arranged in said chamber, an inlet aperture and an outlet aperture on the chamber for the ice-cream mix, and means for supplying compressed air to the chamber, characterised by a spring-loaded non-return valve on the chamber arranged in the air supply means to prevent entry of the ice-cream mix into the air supply, and an adjustable constant-pressure control valve arranged in the air supply means and serving to keep the pressure of said air supply constant, whereby when the chamber is charged with a given quantity of ice-cream mix, the quantity of air incorporated therein depends upon the pressure of the air supply and constant proportions can be maintained for successive charges by maintaining the said air pressure constant.

2. Apparatus for freezing, aerating and beating, a charge of ice-cream mix, of the kind comprising a refrigerated mixing chamber, to receive the whole of the charge, beating and scraping means revolvably arranged in said chamber, an inlet aperture and an outlet aperture on the chamber for the ice-cream mix, and means for supplying compressed air to the chamber, characterised by a spring-loaded check valve on the said outlet aperture to control the rate of discharge from the chamber, a stop-cock on said check valve to shut off the discharge of the ice-cream mix and an adjustable constant-pressure control valve arranged in the air supply means and serving to keep the pressure of said air supply constant, whereby when the chamber is charged with a given quantity of ice-cream mix, the quantity of air incorporated therein depends upon the pressure of the air supply and constant proportions can be maintained for successive charges by maintaining the said air pressure constant.

3. Apparatus for freezing, aerating and beating, a charge of ice-cream mix, of the kind comprising a refrigerated mixing chamber, to receive the whole of the charge, beating and scraping means revolvably arranged in said chamber, an inlet aperture and an outlet aperture on the chamber for the ice-cream mix, and means for supplying compressed air to the chamber, characterised by an inlet valve on the said inlet aperture for varying and sealing said inlet aperture, control means for said inlet valve whereby it can be partially opened and then withdrawn from the inlet aperture to provide a clear passage therethrough, a spring-loaded check valve on the said outlet aperture to control the rate of discharge from the chamber, a stop-cock on said check valve to shut off the discharge of the ice-cream mix into the air supply, and an adjustable constant-pressure control valve arranged in the air supply means and serving to keep the pressure of said air supply constant, whereby when the chamber is charged with a given quantity of ice-cream mix, the quantity of air incorporated therein depends upon the pressure of the air supply and constant proportions can be maintained for successive charges by maintaining the said air pressure constant.

TITO GIUSTI.
RAOLO BENVENUTO GIUSTI.

REFERENCES CITED

The following references are of record in the file of this patent:

UNITED STATES PATENTS

| Number | Name | Date |
| --- | --- | --- |
| 1,533,708 | Pfouts | Apr. 14, 1925 |
| 1,779,330 | Pfouts | Oct. 21, 1930 |
| 2,290,214 | Smith | July 21, 1942 |